United States Patent
Chen et al.

(10) Patent No.: US 12,056,479 B2
(45) Date of Patent: Aug. 6, 2024

(54) MOBILE SERVICE UPGRADE METHOD AND APPARATUS, AND TERMINAL

(71) Applicant: HUAWEI TECHNOLOGIES CO., LTD., Guangdong (CN)

(72) Inventors: Qiulin Chen, Shanghai (CN); Jiangzheng Wu, Hangzhou (CN); Huihai Shen, Hangzhou (CN); Xinjian Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 75 days.

(21) Appl. No.: 17/848,737

(22) Filed: Jun. 24, 2022

(65) Prior Publication Data

US 2022/0326939 A1   Oct. 13, 2022

Related U.S. Application Data

(63) Continuation of application No. PCT/CN2020/139856, filed on Dec. 28, 2020.

(30) Foreign Application Priority Data

Dec. 27, 2019   (CN) .......................... 201911382884.0

(51) Int. Cl.
*G06F 9/44*   (2018.01)
*G06F 8/65*   (2018.01)
(Continued)

(52) U.S. Cl.
CPC .................. *G06F 8/65* (2013.01); *G06F 8/71* (2013.01); *G06F 9/44521* (2013.01); *H04L 67/5682* (2022.05)

(58) Field of Classification Search
None
See application file for complete search history.

(56) References Cited

U.S. PATENT DOCUMENTS

2013/0332943 A1* 12/2013 Sun .......................... G06F 8/656
                                                               719/331
2016/0182248 A1*  6/2016 Yi ....................... H04L 12/2807
                                                               709/220
(Continued)

FOREIGN PATENT DOCUMENTS

CN      103973745 A      8/2014
CN      105867964 A      8/2016
(Continued)

OTHER PUBLICATIONS

International Search Report and Written Opinion in International Appln. No. PCT/CN2020/139856, mailed on Mar. 29, 2021, 18 pages (with English translation).

(Continued)

*Primary Examiner* — Qamrun Nahar
(74) *Attorney, Agent, or Firm* — Fish & Richardson P.C.

(57) ABSTRACT

This application provides example mobile service upgrade methods, media, and devices. One example method includes receiving a target service invocation request sent by an application, where a target service is one of a plurality of services comprised in a mobile service. A new version of the target service is downloaded from a remote computer in response to determining, based on the target service invocation request, that the target service needs to be upgraded, where the new version is a version that meets a requirement of the target service invocation request. The new version of the target service is loaded and run.

17 Claims, 10 Drawing Sheets

(51) Int. Cl.
    *G06F 8/71*     (2018.01)
    *G06F 9/445*     (2018.01)
    *H04L 67/5682*     (2022.01)

(56) References Cited

U.S. PATENT DOCUMENTS

| | | | |
|---|---|---|---|
| 2017/0147323 A1 | 5/2017 | Hu et al. | |
| 2019/0129733 A1* | 5/2019 | Liao | G06F 8/65 |
| 2020/0106840 A1* | 4/2020 | Liu | H04L 67/55 |

FOREIGN PATENT DOCUMENTS

| | | | |
|---|---|---|---|
| CN | 105893045 A | 8/2016 | |
| CN | 105893070 A | 8/2016 | |
| CN | 106155723 A | 11/2016 | |
| CN | 107220074 A | 9/2017 | |
| CN | 107766064 A | 3/2018 | |

OTHER PUBLICATIONS

[No Author Listed] [online], "App Manifest Overview Android Developers," Sep. 15, 2019, Internet Archive: Wayback Machine URL <http://web.archive.org/web/20190915054452/https://developer.android.com/guide/topics/manifest/manifest-intro>, retrieved on Dec. 13, 2022, <https://developer.android.com/guide/topics/manifest/manifest-intro>, 17 pages.

[No Author Listed] [online], "Processes and threads overview Android Developers," Aug. 11, 2019, Internet Archive: Wayback Machine URL <https://web.archive.org/web/20190811194132/https://developer.android.com/guide/components/processes-and-threads>, retrieved on Mar. 23, 2023, <https://developer.android.com/guide/components/processes-and-threads>, 8 pages.

Extended European Search Report in European Appln No. 20905984.9, dated Mar. 31, 2023, 14 pages.

* cited by examiner

MOBILE SERVICE UPGRADE METHOD AND APPARATUS, AND TERMINAL

CROSS-REFERENCE TO RELATED APPLICATIONS

This application is a continuation of International Application No. PCT/CN2020/139856, filed on Dec. 28, 2020, which claims priority to Chinese Patent Application No. 201911382884.0, filed on Dec. 27, 2019. The disclosures of the aforementioned applications are hereby incorporated by reference in their entireties.

TECHNICAL FIELD

This application relates to computer technologies, and in particular, to a mobile service upgrade method and apparatus, a terminal, and the like.

BACKGROUND

In recent years, mobile terminal devices, such as a smartphone, a tablet computer, and a wearable device, develop rapidly, users have increasingly diversified requirements for the mobile terminal devices, and there are increasingly more types of applications on the application terminal devices. To facilitate development of a plurality of types of applications, a mobile service provider provides a mobile service, for example, a Google mobile service (Google mobile service, GMS) provided by Google (Google). The GMS includes a plurality of components such as a public framework and a plurality of types of services (or referred to as sub-applications or kits), and provides an invocation interface for an application developer. In this way, the application developer can directly use any one or more of the plurality of types of services through the invocation interface in a development process without re-development. The plurality of types of services herein are, for example, a map service, an advertisement service, a positioning service, a sports and health service, and a machine learning service.

The mobile service provider integrates the mobile service into an operating system, and provides the operating system for a mobile device manufacturer to preset the operating system on a mobile device. After being developed, each application is also preset on the mobile device or is installed by a user on the mobile device. The software collaborates to meet various requirements of the user in daily life. However, currently an upgrade of a mobile service on a mobile device causes all components in the mobile service to be upgraded together. The upgrade takes a relatively long time, and the mobile device needs to be restarted after the upgrade. This upgrade manner is not only inefficient, but also is inflexible. For example, because the device needs to be restarted after the upgrade, the upgrade on the mobile device is set to a silent upgrade in the background, for example, the upgrade is performed at night when a battery is sufficient or the mobile device is charged, so as to avoid affecting use of a user.

SUMMARY

This application provides a mobile service upgrade method, to enable each component in a mobile service to be independently upgraded. Further, a mobile device does not need to be restarted after upgrading. In this way, upgrade duration of the mobile service is shortened, and flexibility of upgrading the mobile service is improved. For example, an application is upgraded in real time as required, and a component that needs to be upgraded by the application is independently upgraded without restarting a device. The application can use an upgraded component in real time.

In addition, this application further provides various apparatuses, a computer program product (for example, mobile service software or operating system software), a storage medium, a computer device, and the like that implement the foregoing method.

The following describes this application from a plurality of aspects. It is easy to understand that the following plurality of aspects may be separately implemented, or a combination of any two or more aspects may be implemented. For specific implementations and beneficial effects of the following plurality of aspects, refer to each other.

According to a first aspect, this application provides a mobile service upgrade method. The method includes: receiving a target service invocation request sent by an application, where a target service is one of a plurality of services included in a mobile service; downloading a new version of the target service from a remote computer when determining, based on the service invocation request, that the target service needs to be upgraded, where the new version is a version that meets a requirement of the invocation request; and loading and running the new version of the target service.

It should be understood that the foregoing method is also applicable to upgrading a plurality of services.

The service may be understood as a kit in the following embodiments. Certainly, the kit may also include a plurality of components, and the plurality of components may also be considered as the kit. A kit may invoke other kits. A subsequent method may be used to upgrade dependent upgrading.

According to the foregoing method, one or more services in a mobile service can be upgraded based on an invocation requirement of an application when triggered by the application. An upgrade takes less time, is more flexible than a pure silent upgrade in the background, and can meet a requirement of a user in a more timely manner.

The foregoing method may also be applied to a silent upgrade scenario. During a silent upgrade, the one or more services in the mobile service are independently upgraded instead of upgrading the entire mobile service, thereby shortening upgrade duration.

In some implementations, the downloading a new version of the target service from a remote computer when determining, based on the service invocation request, that the target service needs to be upgraded includes: downloading the new version of the target service and a new version of the another service from the remote computer when determining, based on dependency information stored in an application package of the target service, that the target service depends on the another service, and when determining that the another service needs to be upgraded, where the dependency information includes a dependency relationship between the target service and one or more other services.

In some implementations, the dependency information is stored in a manifest file, and the dependency information is added to the manifest file at a phase of compiling the application package of the target service.

In the foregoing manner, when a service is upgraded, another service on which the service depends may be upgraded (upgraded based on a requirement, or not upgraded if there is no requirement) based on dependency information included in an APK of the service. This avoids an application invocation failure caused because a version of the dependent service does not meet a requirement.

In some implementations, the loading the new version of the target service includes: searching a class loader routing table to determine a class loader, and loading a class file of the target service or a class file of a sub-service of the target service by using the found class loader, where the class loader routing table includes a correspondence between a service name, a package name, and a class loader.

In some implementations, the searching a class loader routing table to determine a class loader, and loading a class file of a sub-service of the target service by using the found class loader includes: creating a first class loader and a second class loader of the target service, and storing correspondence information between the target service and the first class loader in the class loader routing table, where the class loader routing table includes a correspondence between a package name and a service name, and a service stored in the class loader routing table includes the sub-service; invoking a loadClass (loadClass) method of the second class loader by using a loadClass (loadClass) method of the first class loader, to extract a package name of the sub-service and search the class loader routing table for a sub-service name and a class loader that match the package name; and loading the class file of the sub-service by using the found class loader.

It should be understood that loadClass is merely a name of an implementation method commonly used in the art herein, and the name may not be used in other embodiments of this application.

A Java (a high-level programming language) program usually uses a parents delegation model to load a class file. However, in a mobile service framework, there are many class loaders. The parents delegation model may cause incorrect class loading versions, which is inconvenient for management. This application proposes a routing table. A correspondence between a service name, a package name, and a class loader is recorded by using the routing table. Then, the routing table is queried when a class file is loaded, to obtain a corresponding class loader, instead of using the conventional parents delegation model. In this way, a plurality of class loaders are centrally assigned according to the routing table, so that management is more convenient, search becomes flattened, decoupling between applications can be implemented, class routes are centrally managed and controlled, and dependency is clearer.

It should be understood that the foregoing class loader selection method may also be used during a silent upgrade in the background.

In some implementations, the running the new version of the target service includes: querying a configuration file of the target service, and selecting, from a plurality of processes with different priorities, a target process indicated by the configuration file to run the target service.

Because each kit has its own service requirement, this embodiment provides a process pool with different priorities. A process with a priority that matches the service requirement is selected according to an indication of a configuration file of the kit to run the kit. This improves flexibility of process selection and meets the service requirement.

In some implementations, the running the new version of the target service includes: selecting, based on a process load condition, a target process from a plurality of processes with a same priority to run the target service, where a load of the target process is less than or equal to that of another process in the plurality of processes with the same priority.

In this method, a process with a lower load is selected based on a load status to run a current kit. In this way, running efficiency of the kit can be improved.

In both the foregoing priority method and selection of the process with a lower load, it may be considered that a process pool is established, and a proper process is selected from the process pool to run the kit. This avoids a problem that a quantity of processes is excessively large because one kit starts an independent process. The foregoing priority-related method may alternatively be used together with the loading method. For example, a proper priority is first selected based on priorities, and then a process with a lower load is selected from processes with a same priority based on loads.

In addition to the method, this application further provides an apparatus, a computer storage medium, a computer program product, and the like for implementing the method.

According to a second aspect, this application further provides a mobile service upgrade apparatus. The apparatus includes one or more modules, configured to implement the method according to any implementation of the first aspect. It should be understood that the modules may one-to-one correspond to the method steps, or may not one-to-one correspond to the method steps. A name of the module is not limited. The upgrade apparatus may be, for example, an HMS framework described in embodiments.

According to a third aspect, this application further provides a terminal device. The terminal device includes a processor and a memory. The memory is configured to store computer-readable instructions, and the processor is configured to execute the computer-readable instructions to implement the method according to any one of the foregoing aspects.

According to a fourth aspect, this application further provides a computer program medium. The computer program medium includes computer-readable instructions. When the computer-readable instructions are executed by one or more processors, the method according to any one of the foregoing methods is implemented.

According to a fifth aspect, this application further provides a computer program product (or referred to as a computer program). The computer program product includes computer-readable instructions. When the computer-readable instructions are executed by one or more processors, the method according to any one of the foregoing aspects is implemented.

BRIEF DESCRIPTION OF DRAWINGS

The following briefly describes accompanying drawings of this application. It is clear that the accompanying drawings in the following description show only some embodiments of this application.

DESCRIPTION OF EMBODIMENTS

A mobile service (mobile service, MS) includes an MS core (core) and a plurality of applications (Apps). To distinguish from an existing mobile service for ease of description, the MS provided in the embodiments is named an HMS, and correspondingly, the MS core is named an HMS core. The HMS core includes an HMS framework (framework) and a sub-application. The sub-application is a general name of a function or capability module that can be invoked or integrated by a third-party application, and may also be referred to as a kit in the following embodiments. The HMS framework may also exist as a kit, which is referred to as an HMS framework kit. When the third-party application invokes a kit, some modules such as libraries (libraries) need to be integrated. These modules include invocation interfaces, and these modules are referred to as software development kits (Software Development Kits, SDKs) of the kit. A collection of SDKs of all kits and some public modules is referred to as an HMS SDK. One kit may include a plurality of components, and each component may also be referred to as a kit. One kit can integrate SDKs of other kits to invoke the other kits.

It should be noted that, for ease of application and understanding, some systems, modules, devices, elements, data structures, instructions, and the like that are mentioned are named in English in the embodiments of this application. Uppercase and lowercase of these names have same meanings unless otherwise specified. In addition, these names may be changed as required, and should not constitute any limitation on the solution provided in this application.

Figure 1:
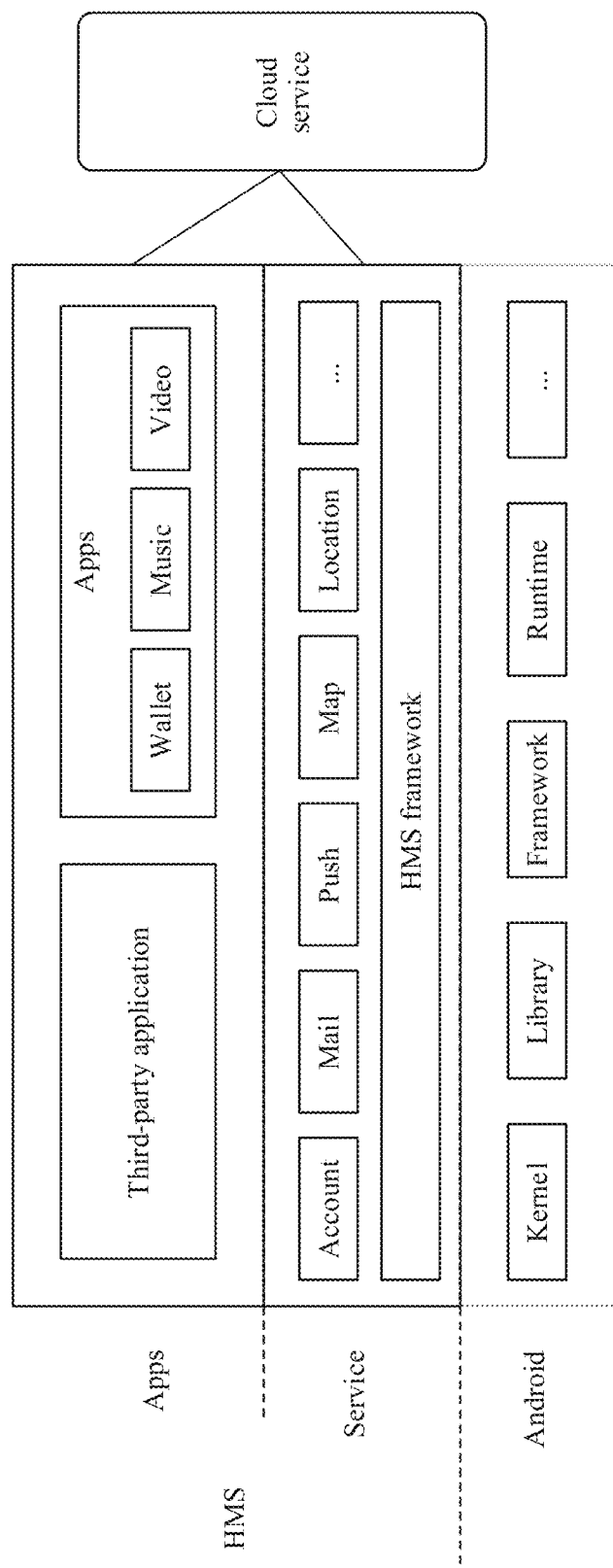
FIG. 1 is a schematic diagram of an architecture of an HMS according to an embodiment.

FIG. 1 is a schematic diagram of an architecture of an HMS according to an embodiment. The HMS is deployed on an Android operating system on a device side. An application layer includes a third-party application (3rd App) and an application provided by an HMS provider (or referred to as a Huawei-developed application). These applications are deployed on an HMS core. The HMS core includes a plurality of kits which may also be referred to as a plurality of services, for example, an account kit, an email kit, a push kit, a map kit, and a location kit. These kits are deployed on an HMS framework and managed by the HMS framework. The HMS framework also provides public function support for these kits. In addition, an application can further access a cloud service provided by a remote server, and each kit in the HMS core can also access the cloud service, for example, a kit upgrade. The operating system internally includes modules such as a kernel, a runtime, a framework, and a library. Refer to an existing Android operating system, and details are not described in this embodiment.

Figure 2:
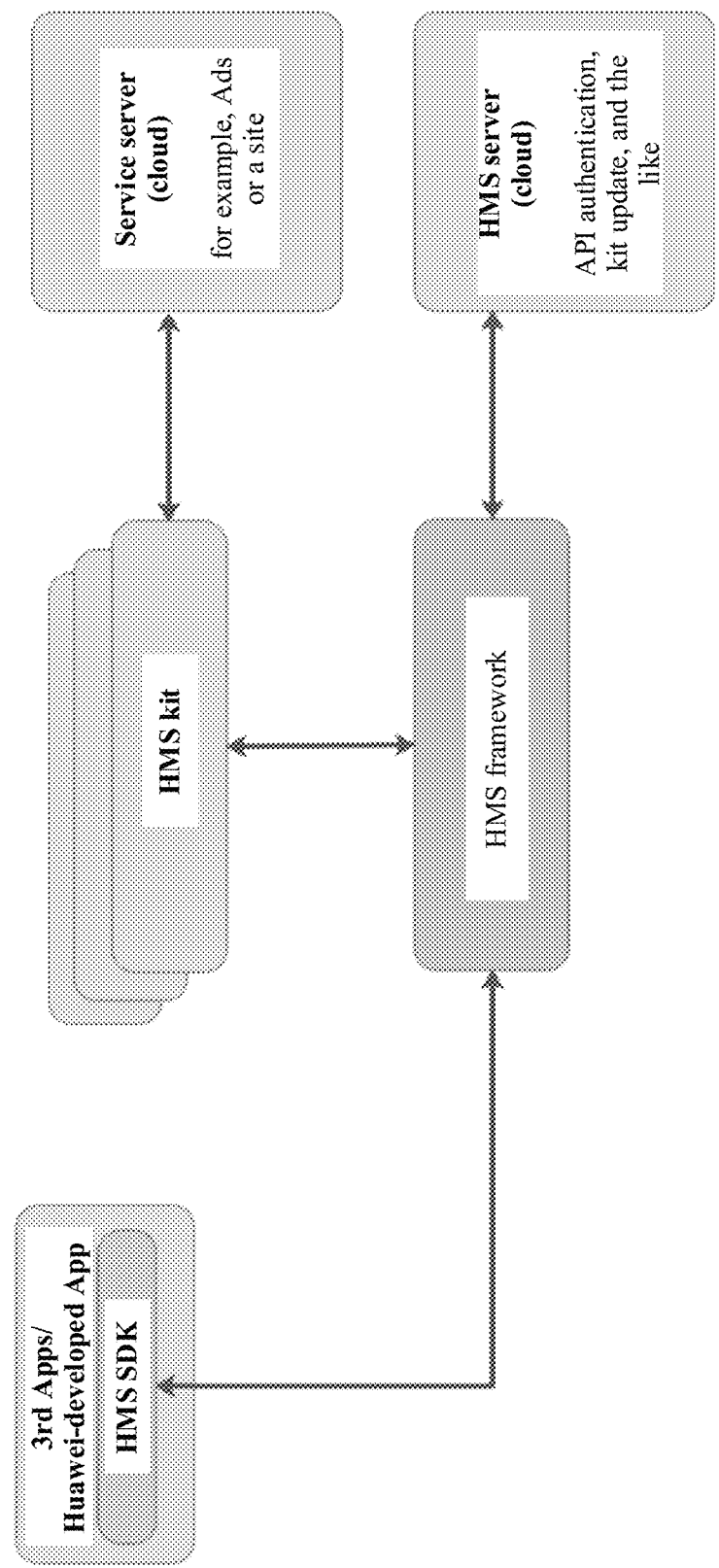
FIG. 2 is a schematic diagram of application of an HMS framework.

FIG. 2 is a schematic diagram of application of an HMS framework. The HMS framework supports a third-party/Huawei-developed application to easily invoke each HMS kit. Boundaries of the HMS framework include an HMS SDK and an HMS framework interface that are integrated in the third-party/Huawei-developed application. The HMS SDK authenticates an application programming interface (application programming interface, API), invokes a kit, and the like. The HMS framework manages each HMS kit, including loading and invoking the HMS kit. The HMS framework interacts with a cloud server to update the kit and authenticate the API.

The solution provided in this embodiment is mainly implemented in the HMS framework. Certainly, some functions also need to be completed by another module such as the HMS SDK in cooperation with the HMS framework. In this embodiment, each kit in the HMS is designed in a plugin-based idea. To be specific, each kit is independently packaged into an Android application package (Android application package, APK) and independently released. These independently released kits may also be considered as independent Apps. Further, according to the method provided in this embodiment, these APKs are installation-free in an Android system, and it can be ensured that an application accesses these APKs. This further implements a function such as not restarting a terminal device when a kit is upgraded. In other embodiments, one APK may also include a plurality of kits. This is not limited in this application.

Figure 3:
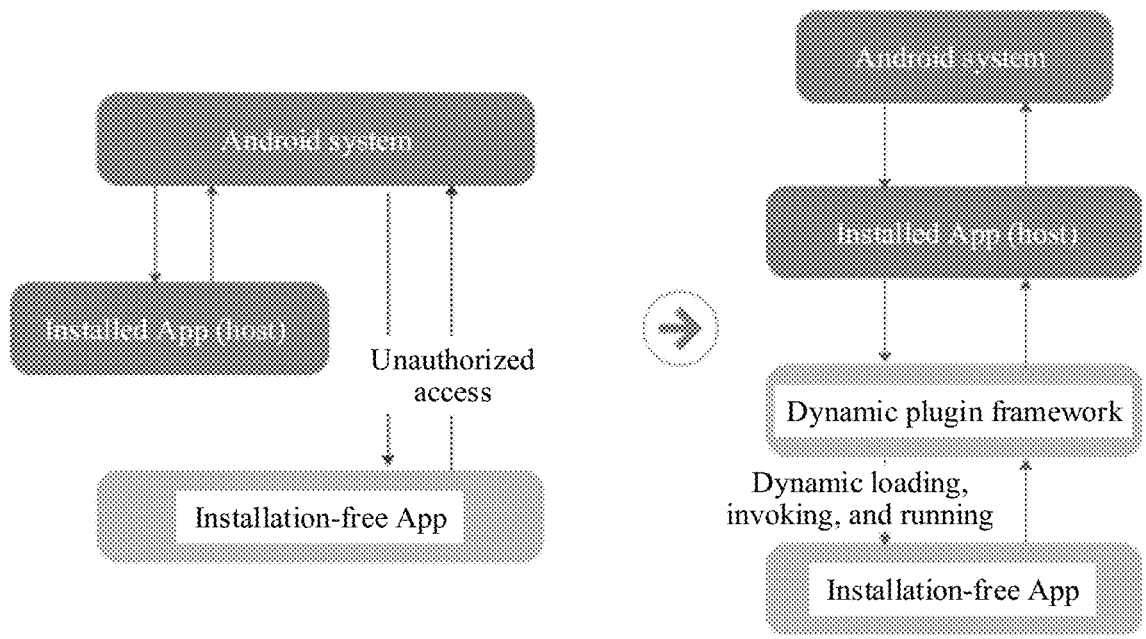
FIG. 3 is a main design idea of implementing an installation-free APK according to an embodiment.

FIG. 3 is a main design idea of implementing an installation-free APK according to an embodiment. As shown in the figure, an installation-free App is not registered in an Android system and is invisible to both a third-party application and the system. Therefore, the App cannot be invoked, loaded, or run. The HMS framework provided in the embodiments is equivalent to a dynamic plugin framework. The HMS framework is responsible for managing the installation-free APP, and dynamically loading an installation-free plugin APP according to invocation of the system or the third-party application, so that the third-party application or the system can invoke a plugin.

Figure 4:
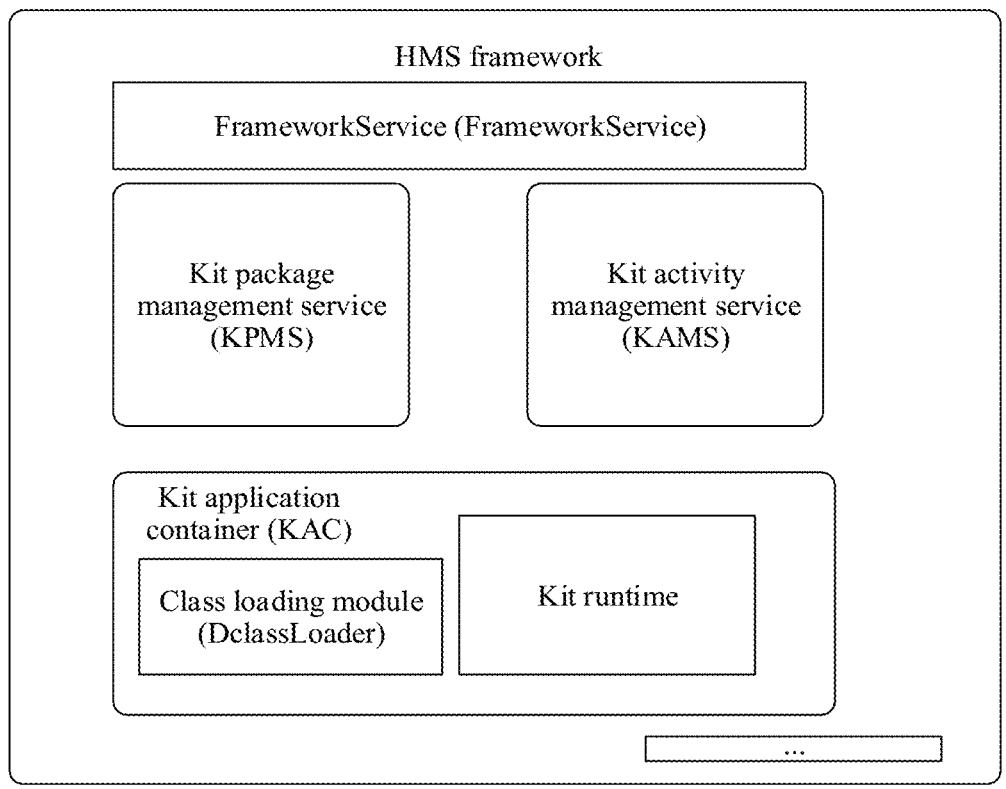
FIG. 4 is a diagram of a logical architecture of an HMS framework according to an embodiment.

FIG. 4 is a diagram of a logical architecture of an HMS framework according to an embodiment. As shown in the figure, the framework mainly includes a FrameworkService (FrameworkService) module, a kit package management service (Kit package management service, KPMS) module, a kit activity management service (Kit Activity Management Service, KAMS) module, and a kit application container (Kit application container, KAC) module. The FrameworkService module provides a service end for an HMS SDK interface, to authenticate an HMS API invoked by an application and route invocation of an HMS SDK to a corresponding kit for invocation. The KPMS module is mainly configured to: parse a kit package, and manage and query meta-data information of a kit; download and install the kit; and update the kit and a framework module (including silent update, update triggered by application invoking, dependent update, and forcible update). The KAMS module is mainly configured to: manage a kit process; manage and schedule a stub (stub) resource; and schedule the kit process; and delegate broadcast processing (register a static broadcast for each kit, and distribute a received broadcast). The KAC module is mainly configured to load the kit to a container process and run the loaded container process. The KAC module includes a class loading module (DclassLoader) configured to select a proper class loader for the kit. The KAC module further includes a kit runtime (runtime) module configured to manage a kit runtime. The HMS framework further includes other modules that are not shown in the figure, such as a test module and the FrameworkService module.

Figure 5:
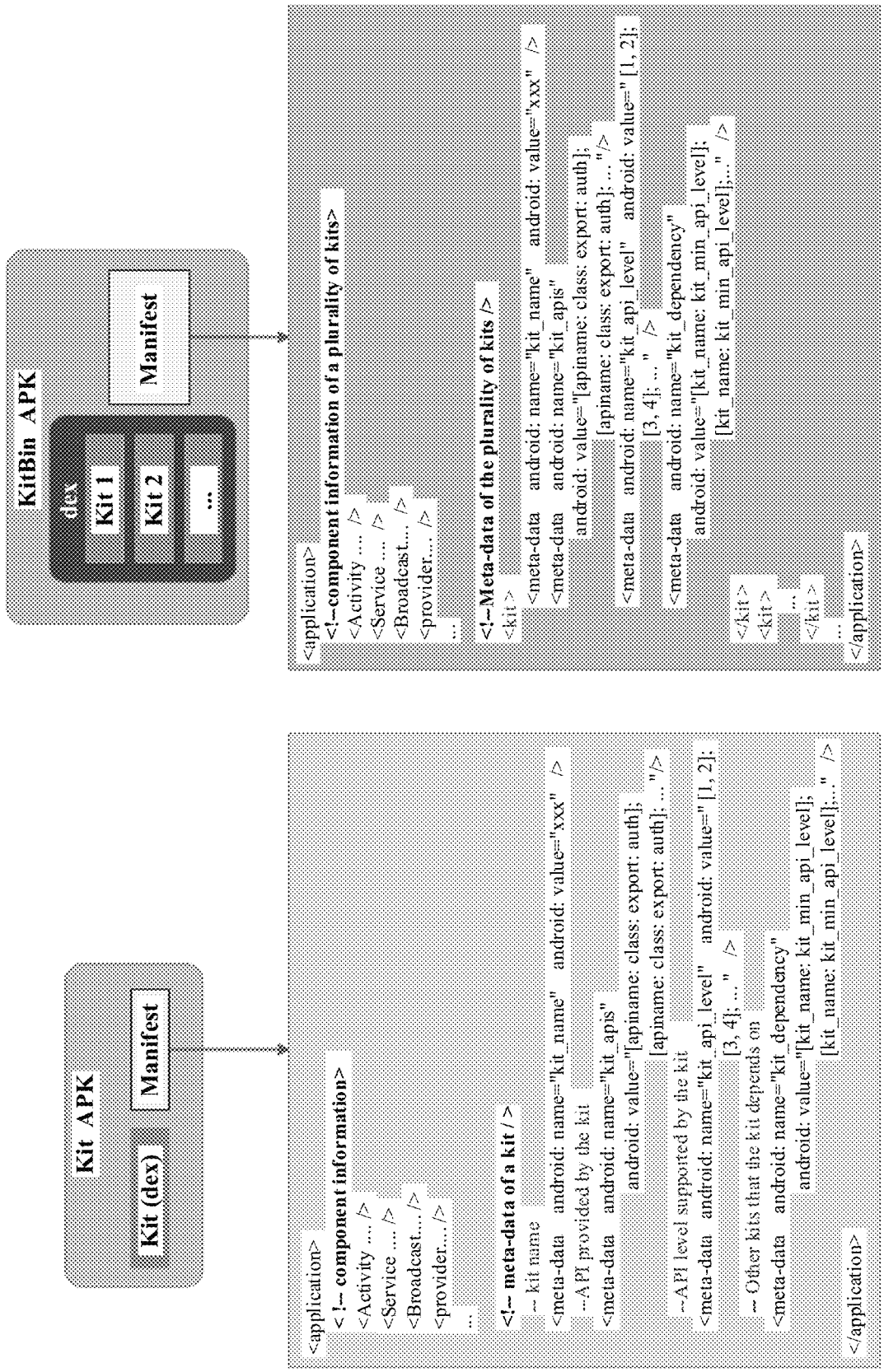
FIG. 5 is an example diagram of kit packaging.

As mentioned above, in the embodiments, one or more kits are packaged into an independent APK, to support independent release and upgrading of the kit. FIG. 5 is an example diagram of kit packaging. A kit is packaged in two ways. In one way, a single kit is independently packaged into an APK. Manifest of the APK is information about the kit, mainly including a component and meta-data (meta-data). In the other way, the kit is packaged in a form of KitBin APK. A plurality of kits are packaged into one APK in dex. In this case, manifest of the APK includes component information and meta-data information of all kits in the APK. The meta-data needs to be distinguished by kit. Therefore, <kit> Tag is used to distinguish the meta-data. It is noted that the meta-data information of the kit is used by a KPMS in an HMS framework, especially for storing a DB after parsing. Therefore, a parser of the KPMS needs to parse the meta-data of the kit based on <kit>.

Figure 6:
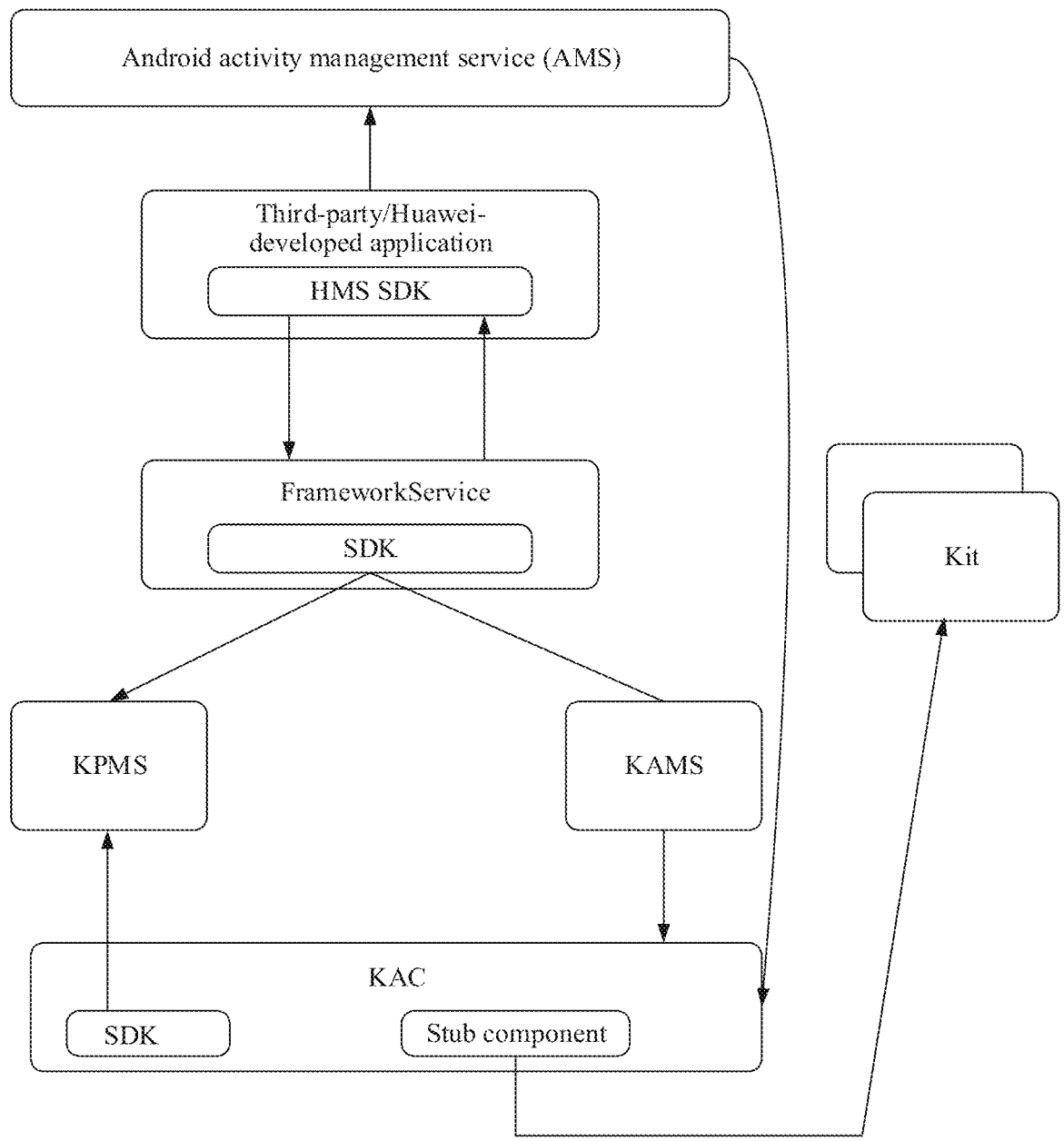
FIG. 6 is a schematic diagram of an invocation relationship between modules in an HMS framework according to an embodiment.

FIG. 6 is a schematic diagram of an invocation relationship between modules in an HMS framework. As shown in the figure, a third-party/Huawei-developed App invokes a framework service through an HMS SDK API for API authentication, kit invocation, and the like. The framework service invokes a KPMS through SDKs of the KPMS and a KAMS to query related information of a kit, and enables the KAMS to schedule a stub resource. A KAC may query the related information of the kit from the KPMS. The KAMS may distribute broadcast to a kit in the KAC. The framework service may load the kit and invoke a class method in the kit through reflection. The KAC may invoke an interface of an AMS to start components (such as StartActivity and StartService) in the kit. The KPMS may further receive installation and update notifications from the kit.

Based on the foregoing HMS framework, the following describes a kit upgrade method provided in this embodiment. In this method, when an application invokes a kit, the kit can be independently upgraded, and subsequently independently loaded and run without waiting for a silent upgrade in the background. Further, if the kit depends on another kit, the method provided in this embodiment may further detect dependency, and upgrade the another kit when the another kit needs to be upgraded. Further, after all kits are upgraded, a system does not need to be restarted, and an execution function of an upgraded kit can continue to be used only after an application is restarted. In addition, to reduce interference to a user in a kit upgrade process, this embodiment provides a unified interface.

A main idea of this upgrade method is to sort out a dependent kit set in an application compilation phase, extend a manifest file of a kit to store the dependent kit set, search for a nested dependent kit of the kit during running, and manage upgrade of all kits on a unified UI interface to solve a problem that a user cannot experience a new function of the kit in a timely manner.

Figure 7:
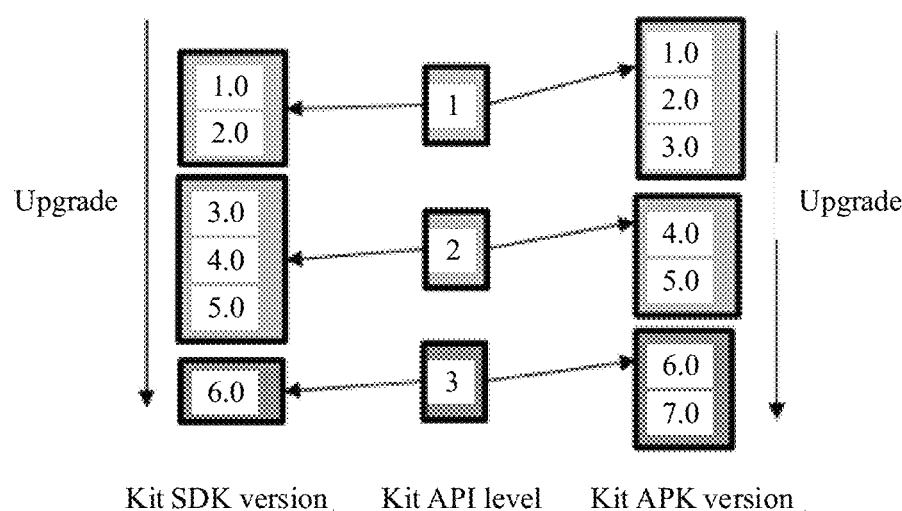
FIG. 7 is an example diagram of an API level according to an embodiment.

For ease of understanding of this method, a concept of an API level (level) is introduced first. As shown in FIG. 7, version numbers of a kit APK and a kit SDK may be upgraded respectively. As long as an API capability provided by the APK for the SDK do not change, the API level remains unchanged. Once the API capability changes, the API level needs be upgraded. There is a one-to-many relationship between the API level and the kit APK, and there is also a one-to-many relationship between the API level and the kit SDK. The kit SDK requires the kit APK to provide a minimum API level. As shown in the foregoing figure, if version numbers of the kit SDK are 3.0, 4.0, and 5.0, an API level provided by the kit APK needs to be at least 2, and a version number of the corresponding kit APK may be 4.0 or 5.0.

Each kit and the framework release their own APKs and corresponding SDKs (the SDKs are provided in .aar format, which is a packaging mode of an Android SDK library). Before an APK or an SDK is compiled, meta-data (namely, meta-data, same below) is configured in manifest.xml. When SDKs provided by other dependent APKs are compiled through implementation, the APK automatically adds the meta-data configured by the SDK to the manifest.xml of the APK. That is, the APK automatically generates a dependency relationship on the other APKs. After the APK is downloaded from an application store, a list of dependent modules of the APK can be obtained by parsing the manifest.xml of the APK. A corresponding package name can be queried based on a name of a dependent module. Then, a latest APK can be downloaded from the application store based on the package name. All dependent APKs can be downloaded by cyclically parsing the list of the dependent modules of the APK. After these APKs are installed, an upgrade process of this kit is complete.

Figure 8:
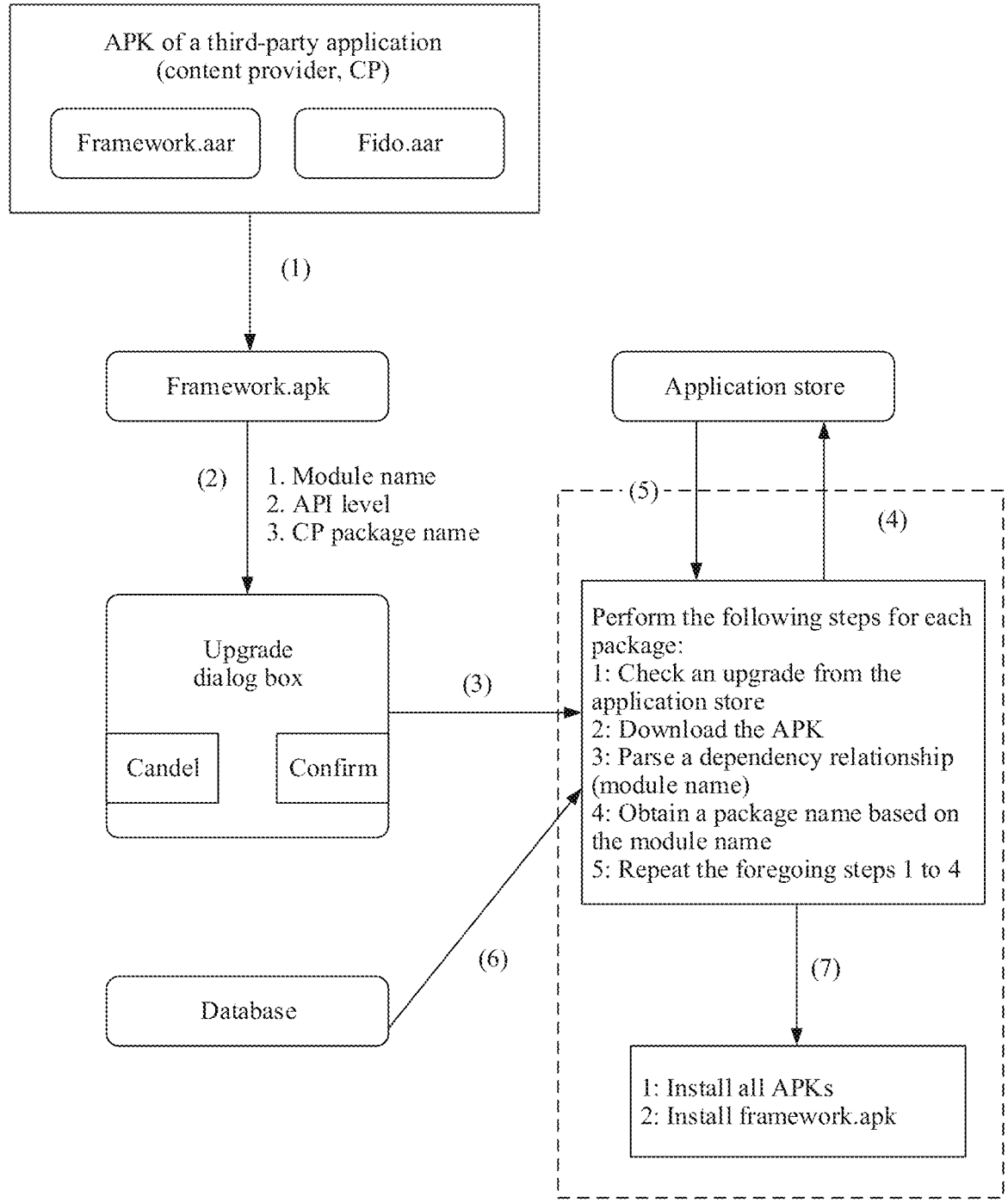
FIG. 8 is an example diagram of an upgrade procedure according to an embodiment.

FIG. 8 is an example diagram of an upgrade procedure. Invoking by a third-party application is used as an example, and detailed steps are as follows:

1. The third-party application integrates SDKs provided by a framework and fido. Manifest.xml of an APK of the third-party application automatically carries API levels on which a fido APK and a framework APK depend. The third-party application invokes an API provided by the fido SDK through a user operation, as shown in (1) in FIG. 8.

2. After receiving an API invocation request from the third-party application, the framework queries a local database for a module that meets a condition based on a module name and a corresponding API level. If the module does not meet the condition, the framework triggers an upgrade dialog box (upgrade dialog box), as shown in (2) in FIG. 8.

3. After a user clicks "confirm" in the upgrade dialog box, meta-data information of the third-party APK is parsed based on a third-party application package name transferred by the framework, to obtain all dependent module names and corresponding API levels. All package names that do not meet the condition are queried from the local database, and a next upgrade operation is proceeded, as shown in (3) in FIG. 8.

4. For each package that needs to be upgraded, whether a new version of the corresponding package is available is checked in the application store. As shown in (4) in FIG. 8, if the new version is available, a next download procedure is proceeded.

5. The latest version of the corresponding package is downloaded from the application store, as shown in (5) in FIG. 8, and all the dependent module names and the corresponding API levels are parsed from the APK.

6. Whether the module that meets the condition exists in the local database is queried based on the module name and the API level that are parsed in the previous step. If the module that meets the requirement does not exist, an APK package corresponding to the module is upgraded.

7. Steps 4 to 6 are repeated until all dependency conditions for upgrading the APK are met locally.

8. After all APK packages are downloaded, an installation step is proceeded. During installation, a module name and an API level in meta-data of each APK are parsed and stored to the local database, as shown in (7) in FIG. 8.

To implement the foregoing upgrade process, the following operations may be performed during kit development and configuration phases:

1. Each kit and the framework respectively configure meta-data in manifest.xml of an APK and a corresponding SDK. For the APK, a module name and a currently provided API level (API capability) of the APK need to be configured in manifest.xml.

Standard format:
<meta-data android:name="com.huawei.hms.kit.api_level:{kit_name}" android:value="{api_level}"/> fido is used as an example:
<meta-data android:name="com.huawei.hms.kit.api_level:fido" android:value="3"/>

Descriptions:
(1) com.huawei.hms.kit.api_level is a fixed prefix.
(2) fido indicates a module name, which needs be unique. A plurality of module names may be configured for each kit.
(3) "3" in android:value="3" indicates an API level.

For the SDK, a minimum API level of the corresponding APK required by the SDK needs to be configured. Therefore, the SDK may be provided in a .aar format because another APK can depend on and compile .aar through implementation.

Standard format:
<meta-data android:name="com.huawei.hms.min_api_level:{artifactId}:{kit_name}" android:value="{kit_api_level}"/>

The SDK provided by fido is used as an example:
<meta-data android:name="com.huawei.hms.min_api_level:fido:fido" android:value="3"/>

Descriptions:
(1) com.huawei.hms.min_api_level is a fixed prefix.
(2) {artifactId}: A key of meta-data cannot be duplicated. Therefore, this identifier is added to correspond to a marven repository address of each kit. The marven repository address of each kit is unique.
(3) fido indicates a module name. A module name of each kit needs be unique.
(4) "3" in android:value="3" indicates that this SDK requires that an API level of a corresponding APK be at least 3.

2. When the APK of the kit or the third-party application (also referred to as a content provider, CP, same below) integrates an SDK provided by the another kit or the framework in a compilation phase, a dependency relationship is automatically generated.

The kit may depend on the SDK provided by the framework, or may depend on the another kit. In this way, the APK of the kit needs to integrate the SDKs provided by the framework and the another kit in the compilation phase. During integration, dependency is compiled through implementation. In this way, the meta-data configured by the SDK is automatically inserted into manifest.xml of the APK when the APK is generated through packaging, and the dependency relationship between the framework and the other kit is generated.

For example, it is assumed that there are three kits. Corresponding module names are respectively fido, map, and framework, where fido depends on map and framework, APKs corresponding to fido, map, and framework are fido.apk, map.apk, and framework.apk, and SDKs provided by map and framework are respectively com.huawei.android.hms:map:1.0.0.1 and com.huawei.android.hms:framework:1.1.0.2.

As described in 1, the following meta-data is configured in manifest.xml of map.aar and framework.aar:

Meta-data configuration of com.huawei.android.hms:map:1.0.0.1.aar:

<meta-data android:name="com.huawei.hms.min_api_level:map:map" android:value="2"/>

Meta-data configuration of com.huawei.android.hms:framework:1.1.0.2.aar:

<meta-data android:name="com.huawei.hms.min_api_level:map:map" android:value="2"/>

Meta-data configuration of fido.apk:

<meta-data android:name="com.huawei.hms.kit.api_level:fido" android:value="3"/>

In build.gradle of fido.apk, dependencies on map and framework are configured through implementation.

```
dependencies {
    implementation 'com.huawei.android.hms:map:1.0.0.1'
    implementation 'com.huawei.android.hms:framework:1.1.0.2'
}
``` fido.apk generated after compilation automatically generates the dependencies on map and framework. As shown in the following figure, an API level provided by fido.apk is 3, and fido.apk requires that an API level of map.apk be at least 2 and that an API level of framwork.apk be at least 3.

<meta-data android:name="com.huawei.hms.kit.api_level:fido"android:value="3"/>
<meta-data android:name="com. huawei.hms.min_api_level:map:map" android:value="2">
<meta-data android:name="com.huawei.hms.min_api_level:framework:framework" android:value="3">

Similarly, the CP also integrates the SDK provided by the kit or the framework. After the CP compiles and generates the APK, the manifest.xml in the APK also automatically carries the meta-data information configured for the kit SDK and the framework SDK, including all the module names and the corresponding API levels that the kit APK and the framework APK depend on.

3. When the user invokes an API to trigger an upgrade through the CP, all dependencies are parsed from the CP and a package that needs to be upgraded is obtained.

To reduce impact of a plurality of upgrade dialog boxes on user experience, API levels of all modules and the framework on which a current CP depends need to be obtained when the user invokes the API to trigger the upgrade through the CP. Specific steps are as follows:

(1) When the framework starts for the first time, the framework installs all kits and dynamically loads APKs corresponding to the framework, parses module names and API levels that correspond to all the APKs, and stores the module names and the API levels to the local database.

(2) When the CP invokes an API of a kit through a kit SDK, the following information is transferred to the framework: a module name, a required API level, and a package name of a third-party invoker.

(3) The framework queries whether the module that meets the condition exists in the local database based on the module name and the API level. If no module meets the condition, an upgrade dialog box is triggered for the user for confirmation.

(4) If the user confirms the upgrade, the framework parses meta-data information of the third-party invoker from a system based on the package name of the third-party invoker, that is, all module names and corresponding API levels on which the CP depends.

(5) The local database is queried for the module that meets the condition based on all the parsed module names and the parsed API levels. If the module does not meet the condition, a package corresponding to the module is upgraded to obtain names of all packages that need to be upgraded.

4. Updates, downloads, and de-dependencies of the packages that need to be upgraded are cyclically checked until all the dependencies are met locally. After step 3 is performed, the names of all the packages that need to be upgraded are obtained. Steps for performing upgrade based on the package names are as follows:

(1) A latest version number of the APK corresponding to the package name is detected in the application store. If the latest version number is later than a locally installed version number of the APK, the latest version number needs to be downloaded from the application store.

(2) A latest APK is downloaded from the application store based on the package name.

(3) After download is complete, the downloaded APK is parsed to obtain names of all modules on which the APK depends and corresponding API levels.

(4) The local database is queried for a package that meets a condition based on all the parsed module names and the parsed API levels. If the package does not meet the condition, the package is upgraded, to obtain a package to be upgraded based on a dependency.

(5) Steps (1) to (4) are repeated until all dependency conditions for upgrading the APK are met locally.

5. All downloaded packages are installed.

After step 4 is performed, all upgraded APKs are downloaded and installed. Module names and API levels that correspond to the APKs are parsed and stored to the local database.

To sum up, an APK automatically adds meta-data configured by an SDK to manifest.xml of the APK during compilation through implementation. That is, the APK automatically generates a dependency relationship on other APKs. After the APK is downloaded from the application store, the APK parses manifest.xml to obtain a list of modules that the APK depends on, queries a corresponding package name based on a name of a dependent module, and downloads a latest APK from the application store based on the package name. All dependent APKs can be downloaded by cyclically parsing the list of dependent modules of the APK. After these APKs are installed, an upgrade process of this kit is complete.

After the kit is upgraded, an upgraded kit is loaded and run. The following problem may occur during kit loading or running:

An application accesses the kit through an integrated kit SDK. The application may be considered as a host application of the kit. When the host application and the kit invoke different versions of a library at the same time, for example, the host application invokes the json library 1.0, and the kit application invokes the JSON library 2.0, the kit application cannot load a correct JSON version during class loading.

To facilitate understanding of this problem, a common class loading mechanism in Java, namely, a parents delegation model is first described. A main loading principle of the parents delegation model is as follows: When a class loader needs to load a class, the class loader first checks whether the class has been loaded from a loading cache of the class loader. If the class has been loaded, the class is returned. If the class has not been loaded, a father class loader is delegated to load the class. The father class loader uses a same policy. If the class is not loaded by an ancestor loader (Bootstrap ClassLoader), a current class loader loads the class and puts the class in its own loading cache, so that the class can be directly returned when a loading request is received next time.

After the kit is integrated by the host application, the kit and the host application form a father-child relationship for the HMS framework. The host application is the father of the kit. According to an operation mechanism of a parents delegation manner, if the kit has not loaded the JSON class, whether the JSON class exists in the host application is checked. If the kit has loaded the JSON class, the JSON 1.0 version in the host application is returned. However, the kit actually wants to load the JSON 2.0 version. This results in inconsistency between a requirement and a result. It should be understood that, when an application is implemented by using a Java language, the application is essentially a software program including one or more classes (classes).

To resolve this problem, this embodiment provides a class loader selection method. A core idea of this solution is to actively create a class loader and a father class loader of a kit during kit loading, and store a name and the class loader of the kit in a class loading routing table. When a class is loaded, a package name is extracted based on a class name. Then, the kit name is found based on the package name. Finally, the corresponding class loader is found based on the kit name.

Figure 9:
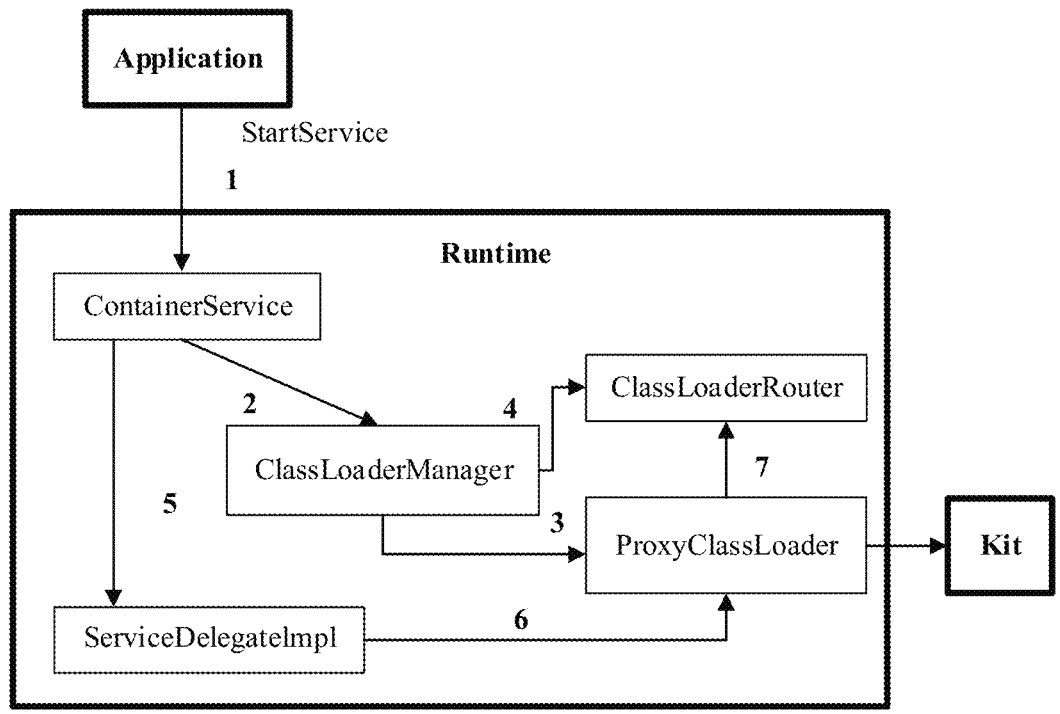
FIG. 9 is a schematic modular diagram of a class loader selection solution according to an embodiment.

FIG. 9 is a diagram of an architecture of the solution. A Runtime module is a running environment of four Android components (Activity, Provide, Service, and Receiver). A main function of the Runtime module is to load a dex file in a kit application package (APK) based on a kit name (for example, a name of a context-aware kit is awareness kit). In this way, an extended component class developed based on the four Android components in the kit application package can be inserted into a corresponding entrusted class in the Runtime module, and can be invoked by a third-party application. Main submodules related to class loading in the Runtime module are ContainerService, ClassLoaderManager, ProxyClassLoader, ClassLoaderRouter, and ServiceDelegateImpl.

The ContainerService module is a standard Android service class, and provides proxy support for an application to invoke a service component in a kit application. The application invokes each interface function in the service class by using an SDK provided by an HMS framework. The SDK of the framework uses a standard API function StartService of an Android system to interact with a ContainerService class. The system invokes OnCreate and onStartCommand functions in the ContainerService class in sequence. This module further defines other standard interface functions of the service class in the Android system.

ServiceDelegateImpl module: Specific service logic of each interface function of a service class proxy is implemented in this module, mainly including loading the kit application package and selecting a stub.

The ClassLoaderManager module is configured to: manage creation and routing of class loading, read existing class loader routing information from a database or file during initialization, create a class loader for a key module (for example, manager or runtime) of the HMS framework, and dynamically generate a father class loader and a proxy class loader of the kit.

The ProxyClassLoader module is configured to: inherit a ClassLoader class of the Android system, extend a loadClass method, extract a package name from a name of a class to be loaded, and find a corresponding class loader from a class loader routing table based on the package name.

The ClassLoaderRouter module is configured to provide initialization, query, and update of class loading routing information. The class loading routing information includes a correspondence between a package name, a kit name, and a class loader. Example:

TABLE 1

| Package name | Kit name |
| --- | --- |
| com.huawei.hms.kit.pm | runtime |
| com.huawei.hms.kit.app | runtime |
| com.huawei.hms.commonkit.config | common |

TABLE 2

| Kit name | Class loader (ClassLoader) |
| --- | --- |
| runtime | RuntimeDexClassLoader |
| common | CommonDexClassLoader |

It should be understood that the foregoing example may alternatively be implemented by using a table or a data structure, or may alternatively be implemented in a kit.

A specific working procedure is as follows:

(1) When an application needs to start a sub-service (also referred to as a sub-kit) of a kit, for example, LocationService, the application invokes a StartService function of the system through the SDK of the framework, and invokes each function of the runtime module in the framework.

It should be understood that the sub-service in this embodiment is a service invoked in the kit, but the sub-service may alternatively be used as an independent service and directly invoked by the application.

(2) After OnStartCommand of the ContainerService module is invoked by the system, a newKitClassLoader function of ClassLoaderManager is invoked. The newKitClassLoader function is used to create a class loader, a father class loader, and a proxy (proxy) class loader of the kit.

(3) A name and the corresponding class loader of the kit are stored in the class loader routing table of the ClassLoaderRouter module.

(4) After creating the class loader of the kit, the ContainerService module transfers the class loader to the ServiceDelegateImpl module, and then invokes a method of the ServiceDelegateImpl module to start loading of the service class LocationService.

(5) The ServiceDelegateImpl module obtains a name of the to-be-started service class, namely, LocationService, and then invokes a loadClass method of the class loader of the kit. This loadClass method invokes a loadClass method of the father class loader, and the loadClass method of the father class loader invokes a loadClass method of ProxyClassLoader. In the loadClass method of ProxyClassLoader, a package name of the LocationService service class is extracted and a name of the kit corresponding to the package name (the kit can be understood as the sub-kit of the kit in step (1) is found, and is a kit that provides a LocationService service). Then, the class loader is selected from the class loading routing table based on the kit name. If the name of the kit corresponding to the package name is found, the class loader is returned and used to load a class file. If the name of the kit corresponding to the package name is not found, a parents delegation model of the Android system continues to be used to select the class loader.

Figure 10:
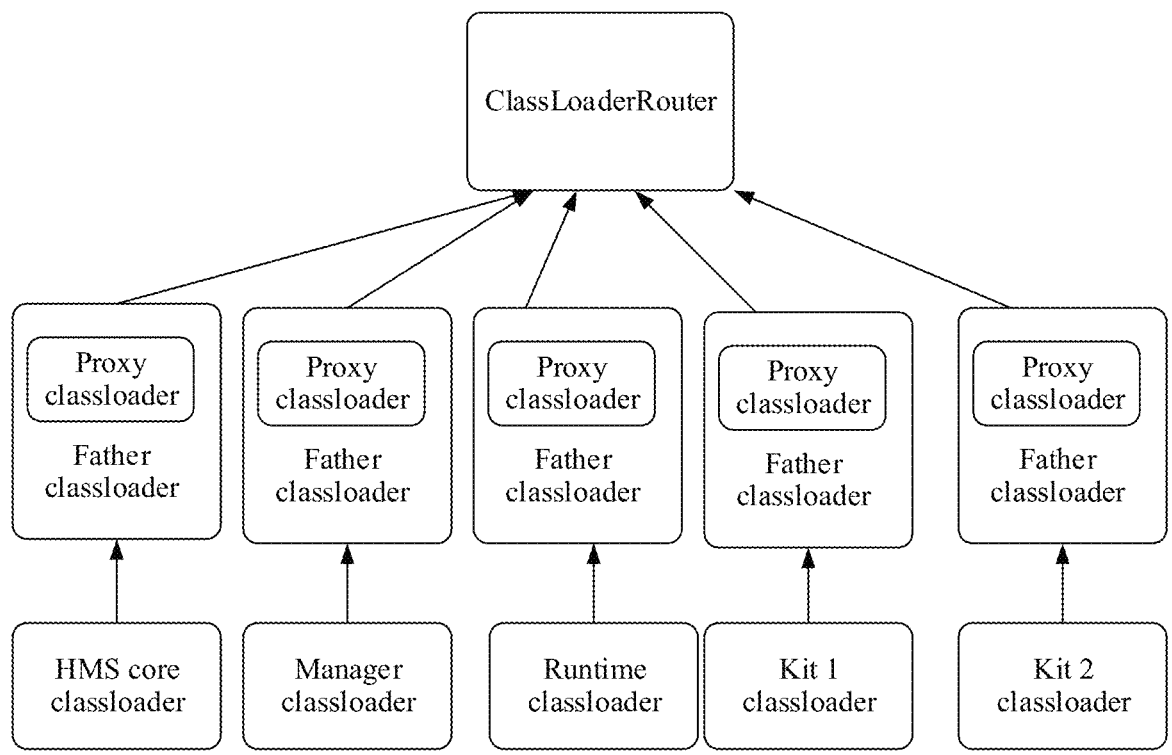
FIG. 10 is a schematic diagram of a relationship between class loaders according to an embodiment.

FIG. 10 shows an example diagram of a relationship between class loaders in the foregoing embodiments. Each class loader has its own father class loader. The father class loader includes a proxy class loader. The proxy class loader is responsible for directing a class loading requirement to a ClassLoaderRouter module, and then obtaining a class loader corresponding to a class by using a routing table in the module. Compared with a parents delegation model in the conventional technology, this method implements centralized management and control on the class loaders, avoids, to some extent, a class loading error that may be caused by the parents delegation model, and avoids, to some extent, a complex dependency relationship between the class loaders caused by parents delegation.

In the conventional technology, during kit loading, an independent process is started each time a kit is started. When a quantity of kits increases, a quantity of processes increases, and more system resources are consumed. In addition, scheduling of the kit process is not differentiated, which cannot meet response requirements of different services.

To resolve this problem, this embodiment provides a kit process management method. In the method, process pools at a plurality of levels are distinguished based on a response speed requirement of a service. When a kit is loaded, an appropriate process is selected from process pools at different priorities based on a cloud configuration rule and a local load balancing principle, to resolve a problem of poor user experience caused by undifferentiated processing of the response requirements of the different services.

In this embodiment, a process is classified into three types: a persist (persist) process which is not likely to be actively ended by a system according to an existing rule, and is also not likely to be ended by an LMK (low memory killer); an HP process which is not likely to be actively ended by the system according to the existing rule, but may be ended by the LMK; and a Normal process which may be actively ended by the system according to the existing rule, and may be ended by the LMK.

Figure 11:
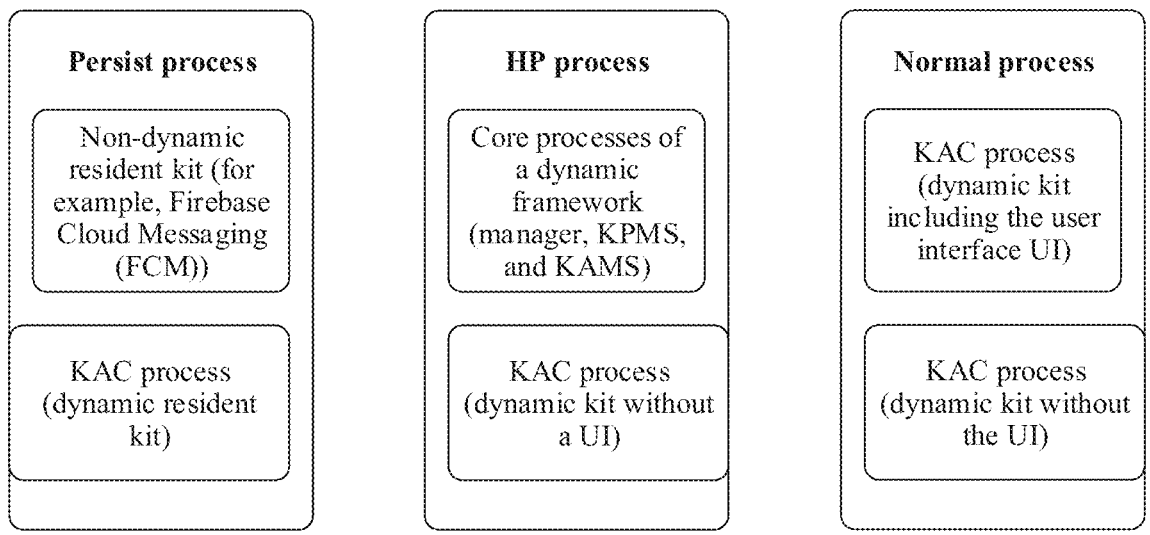
FIG. 11 is a schematic diagram of allocation policies of processes with different priorities according to an embodiment.

FIG. 11 shows an example of an allocation policy.

To prevent the system from actively ending the HP process, a priority of the HP process needs to be increased, so that the priority of the HP process is not lower than that of some foreground processes. This embodiment provides a method for increasing a priority of an HP process: A bidirectional Binder is established between the HP process and a persist process, so that the persist process synchronizes the binder and depends on the HP process.

Figure 12:
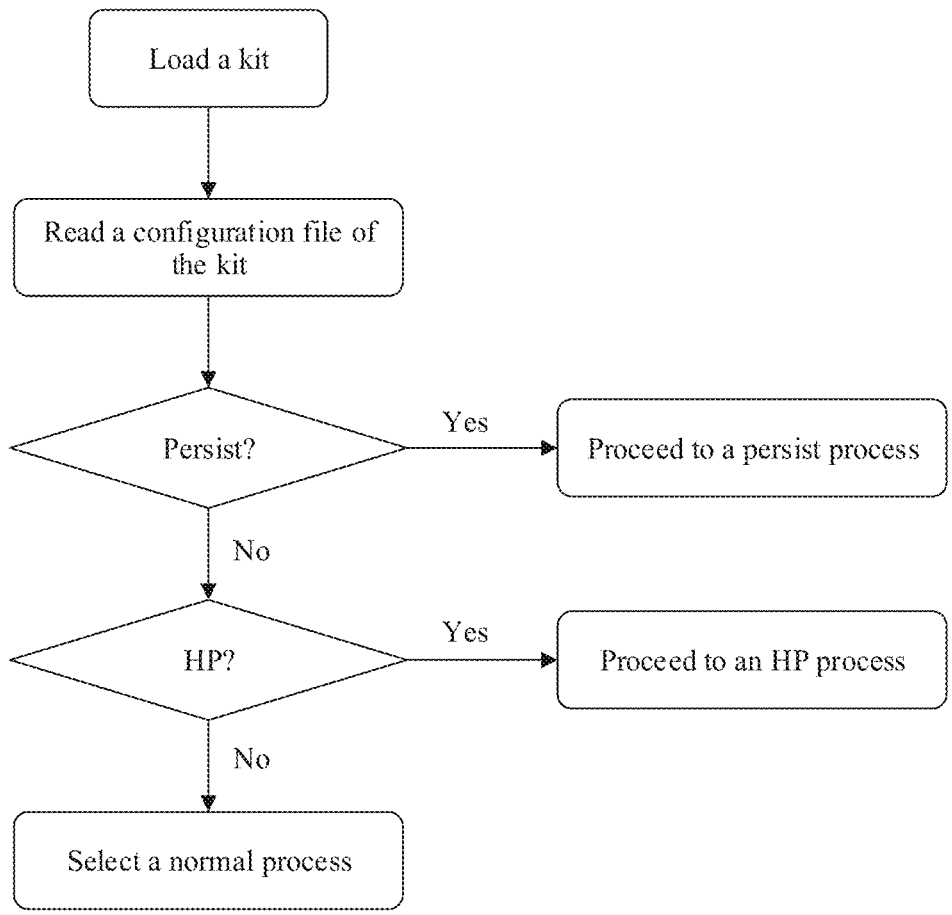
FIG. 12 is a schematic flowchart of process selection according to an embodiment.

FIG. 12 shows a working process of selecting a host process during kit loading. A configuration file of a kit is first read. If the configuration file indicates that a persist process is selected, the persist process is proceeded. If the configuration file indicates that the persist process is not selected, whether an HP process is selected. If the HP process is selected, the HP process is proceeded. If neither the persist process nor the HP process is selected, a Normal process is selected. A kit includes a plurality of sub-parts (which may be referred to as components). When the Normal process is selected, a component is used as an allocation object. A selection principle is as follows:

a. A running component that belongs to a same kit as the to-be-allocated component and has a same configured process attribute is searched in the Normal process. If the component is found, the to-be-allocated component runs in the process to avoid too many processes.

b. If the rule a is not met, a running component that belongs to the same kit as the to-be-allocated component but has a different process attribute from the to-be-allocated component is searched in various processes. If the component is found, the process is excluded from current available processes.

c. A process with a relatively light load is searched in the available processes based on a process load, and the to-be-allocated component runs in the process. Load calculation is determined based on a quantity of actually running components and memory usage. A specific combination rule may be as follows:

(1) The memory usage is divided into several levels. Each level is 200 MB. A load is considered high when the memory usage is higher than 200 MB.

(2) In a same level, a quantity of active components is checked. If the quantity of active components is larger, a load is higher.

In the foregoing solution, processes are classified into three different types, and an important kit with a high service requirement is scheduled to a process with a relatively high priority by using a kit configuration file. For another kit, a process may be further selected based on a load. This improves process selection flexibility while ensuring a service requirement, and avoids an excessive quantity of processes.

It should be noted that the application mentioned above may be a third-party application, or may be a Huawei-developed application, or may be a combination of the third party application and the Huawei-developed application.

The solution provided in the embodiments may be applied to a terminal device, a server, or the like. The terminal device herein includes but is not limited to a smartphone, an in-vehicle apparatus, a personal computer, an artificial intelligence device, a tablet computer, a personal digital assistant, an intelligent wearable device (for example, a smart watch or band or smart glasses), an intelligent voice device (for example, a smart speaker), a virtual reality/mixed reality/enhanced display device or a network access device (for example, a gateway), or the like. The server may include a storage server, a computing server, or the like.

Figure 13:
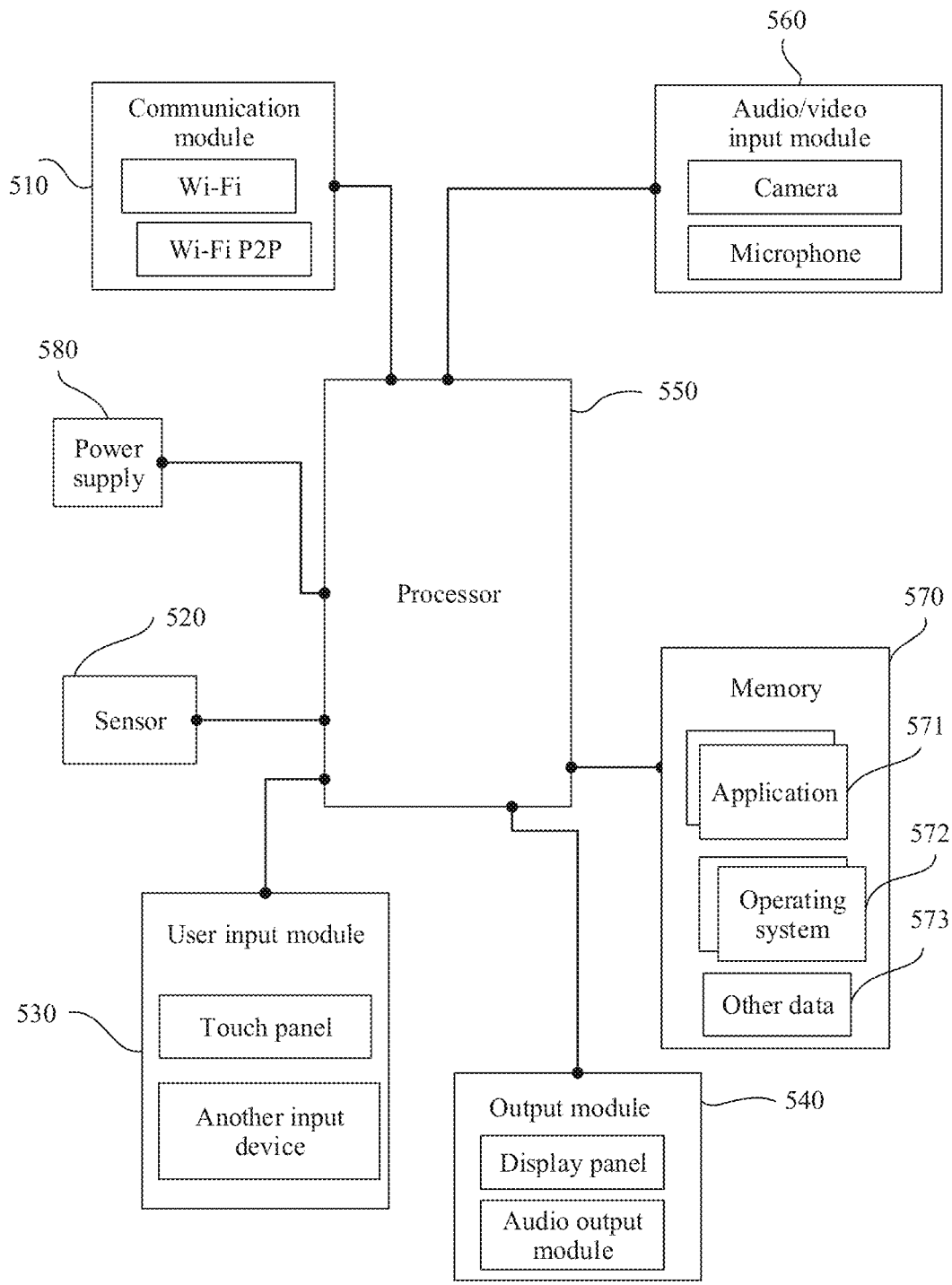
FIG. 13 is a schematic diagram of a logical structure of a terminal device according to an embodiment.

FIG. 13 is a schematic diagram of a structure of a terminal device according to this application. The terminal device may be a smartphone, a smart television, a sound box, a floor-scanning robot, or the like. As shown in the figure, the terminal device includes a communication module 510, a sensor 520, a user input module 530, an output module 540, a processor 550, an audio/video input module 560, a memory 570, and a power supply 580.

The communication module 510 includes a Wi-Fi module and a Wi-Fi P2P module. The two modules may be integrated into one piece of hardware, or may be disposed independently. The communication module 510 may further include other modules that enable the computer system to communicate with a communication system or another computer system. For example, the communication module 510 may further include one or more of a wired network interface, a broadcast receiving module, a mobile communication module, a wireless internet module, a local area communication module, and a location (or positioning) information module. The plurality of modules are all implemented in a plurality of ways in a conventional technology, and are not described one by one in this embodiment.

The sensor 520 may sense a current state of a system, for example, an open/closed state, a location, whether the system is in contact with a user, a direction, and acceleration/deceleration. In addition, the sensor 520 may generate a sensing signal used to control an operation of the system.

The user input module 530 is configured to: receive input digital information or characteristic information or a contact touch operation/contactless gesture, and receive signal input related to user settings and function control of the system, and the like. The user input module 530 includes a touch panel and/or another input device.

The output module 540 includes a display panel, configured to display information entered by the user, information provided for the user, various menu interfaces of the system, or the like. Optionally, the display panel may be configured in a form of a liquid crystal display (liquid crystal display, LCD), an organic light-emitting diode (organic light-emitting diode, OLED), or the like. In some other embodiments, the touch panel may cover the display panel, to form a touch display screen. In addition, the output module 540 may further include an audio output module, an alarm, a tactile module, and the like.

The audio/video input module 560 is configured to input an audio signal or a video signal. The audio/video input module 560 may include a camera and a microphone. In addition, the computer system may further include an audio/video output module, configured to output an audio signal or a video signal.

The power supply 580 may receive external power and internal power under control of the processor 550, and provide power required for operating each component of the computer system.

The processor 550 may indicate one or more processors. For example, the processor 550 may include one or more central processing units, or include one central processing unit and one graphics processing unit, or include one application processor and one coprocessor (for example, a micro control unit or a neural network processor). When the processor 550 includes a plurality of processors, the plurality of processors may be integrated on a same chip, or may be independent chips. One processor may include one or more physical cores, where the physical core is a smallest processing unit.

The memory 570 stores a computer program (or referred to as a computer-readable instruction), and the computer program includes an operating system program 572, an application program 571, and the like. A typical operating system is a system used for a desktop computer or a laptop, for example, a Windows system of Microsoft and a MacOS system of Apple, or a system used for a mobile terminal, for example, a Linux®-based Android (Android®) system, developed by Google.

The memory 570 may be one or more of the following types: a flash (flash) memory, a hard disk type memory, a micro multimedia card type memory, a card type memory (for example, an SD or XD memory), a random access memory (random access memory, RAM), a static random access memory (static RAM, SRAM), a read-only memory (read-only memory, ROM), an electrically erasable programmable read-only memory (electrically erasable programmable read-only memory, EEPROM), a programmable read-only memory (programmable ROM, PROM), a magnetic memory, a magnetic disk, or an optical disc. In some other embodiments, the memory 570 may alternatively be a network storage device on the internet, and the system may perform an operation such as updating or reading the memory 570 on the internet.

The processor 550 is configured to read the computer program in the memory 570, and then perform a method defined by the computer program. The device discovery solution provided in this application is mainly implemented in the operating system program 572, and some functions may also be integrated by the application program 571.

The memory 570 further stores other data 573 in addition to the computer program.

A connection relationship among the modules is only an example. A method provided in any embodiment of this application may also be applied to a terminal device in another connection manner. For example, all modules are connected through a bus. Division into each module is only logical division, and does not necessarily mean that the modules are separated in terms of hardware. The modules are not necessarily essential to some embodiments of this application.

In addition, this application further provides a mobile service upgrade apparatus. The apparatus includes one or more modules, configured to implement the method in any implementation of the first aspect. It should be understood that the modules may one-to-one correspond to the method steps, or may not one-to-one correspond to the method steps. A name of the module is not limited. The upgrade apparatus may be, for example, an HMS framework described in embodiments. This application further provides a computer program medium. The computer program medium includes computer-readable instructions. When the computer-readable instructions are executed by one or more processors, the foregoing method is implemented. This application further provides a computer program product (or referred to as a computer program). The computer program product includes computer-readable instructions. When the computer-readable instructions are executed by one or more processors, the foregoing method is implemented.

It should be noted that division into modules or units provided in the foregoing embodiments is merely an example, functions of the described modules are merely used as examples for description, and this application is not limited thereto. A person of ordinary skill in the art can converge functions of two or more modules thereof as required, or divide a function of one module to obtain more modules at a finer granularity and other variants.

Same or similar parts between the embodiments described above may be cross-referenced. "A plurality of" in this application means two or more or "at least two" unless otherwise specified. "A/B" in this application includes three cases: "A", "B", and "A and B". In this application, "first", "second", "third", and the like are merely used for distinguishing expressions, and are not intended to limit a sequence. In addition, a first object and a second object may be combined or refer to a same object in some cases. Further, because there is no limited sequence, there may be no first, and there may be second or third.

The described apparatus embodiment is merely an example. The modules described as separate parts may or may not be physically separate, and parts displayed as modules may or may not be physical modules, may be located in one position, or may be distributed on a plurality of network modules. Some or all the modules may be selected based on an actual requirement to achieve the objectives of the solutions of the embodiments. In addition, in the accompanying drawings of the apparatus embodiments provided in this application, connection relationships between modules indicate that the modules have communication connections with each other, which may be specifically implemented as one or more communication buses or signal cables. A person of ordinary skill in the art may understand and implement embodiments without creative efforts.

The foregoing descriptions are merely some specific embodiments of this application, but the protection scope of this application is not limited thereto.

What is claimed is:

1. A mobile service upgrade method, comprising:
   receiving a target service invocation request sent by an application, wherein a target service is one of a plurality of services comprised in a mobile service;
   downloading a new version of the target service from a remote computer in response to determining, based on the target service invocation request, that the target service needs to be upgraded, wherein the new version is a version that meets a requirement of the target service invocation request; and
   loading and running the new version of the target service, wherein loading the new version of the target service comprises:
      searching a class loader routing table to determine a class loader; and
      loading a class file of the target service or a class file of a sub-service of the target service by using the determined class loader, wherein the class loader routing table comprises a correspondence between a service name and a corresponding class loader.

2. The method according to claim 1, wherein the downloading a new version of the target service from a remote computer in response to determining, based on the target service invocation request, that the target service needs to be upgraded comprises:
   downloading the new version of the target service and a new version of another service from the remote computer in response to determining, based on dependency information stored in an application package of the target service, that the target service depends on the another service, and in response to determining that the another service needs to be upgraded, wherein the dependency information comprises a dependency relationship between the target service and one or more other services.

3. The method according to claim 2, wherein the dependency information is stored in a manifest file, and the dependency information is added to the manifest file at a phase of compiling the application package of the target service.

4. The method according to claim 1, wherein the searching a class loader routing table to determine a class loader, and loading a class file of a sub-service of the target service by using the determined class loader comprises:
creating a first class loader and a second class loader of the target service, and storing correspondence information between the target service and the first class loader in the class loader routing table, wherein the class loader routing table comprises a correspondence between a package name and a corresponding service name, and a service stored in the class loader routing table comprises the sub-service;
invoking a loadClass method of the second class loader by using a loadClass method of the first class loader, to extract a package name of the sub-service and search the class loader routing table for a sub-service name and a class loader that match the package name of the sub-service; and
loading the class file of the sub-service by using the determined class loader.

5. The method according to claim 1, wherein the running the new version of the target service comprises:
querying a configuration file of the target service; and
selecting, from a plurality of processes with different priorities, a target process indicated by the configuration file to run the target service.

6. The method according to claim 1, wherein the running the new version of the target service comprises:
selecting, based on a process load condition, a target process from a plurality of processes with a same priority to run the target service, wherein a load of the target process is less than or equal to that of another process in the plurality of processes with the same priority.

7. A terminal device, comprising at least one processor and a memory storing computer-readable instructions that when executed, cause the terminal device to perform operations comprising:
receiving a target service invocation request sent by an application, wherein a target service is one of a plurality of services comprised in a mobile service;
downloading a new version of the target service from a remote computer in response to determining, based on the target service invocation request, that the target service needs to be upgraded, wherein the new version is a version that meets a requirement of the target service invocation request; and
loading and running the new version of the target service, wherein loading the new version of the target service comprises:
searching a class loader routing table to determine a class loader; and
loading a class file of the target service or a class file of a sub-service of the target service by using the determined class loader, wherein the class loader routing table comprises a correspondence between a service name and a corresponding class loader.

8. A non-transitory computer-readable storage medium, comprising computer-readable instructions executable by a computer system to perform operations comprising:
receiving a target service invocation request sent by an application, wherein a target service is one of a plurality of services comprised in a mobile service;
downloading a new version of the target service from a remote computer in response to determining, based on the target service invocation request, that the target service needs to be upgraded, wherein the new version is a version that meets a requirement of the target service invocation request; and
loading and running the new version of the target service, wherein loading the new version of the target service comprises:
searching a class loader routing table to determine a class loader; and
loading a class file of the target service or a class file of a sub-service of the target service by using the determined class loader, wherein the class loader routing table comprises a correspondence between a service name and a corresponding class loader.

9. The terminal device according to claim 7, wherein the downloading a new version of the target service from a remote computer in response to determining, based on the target service invocation request, that the target service needs to be upgraded comprises:
downloading the new version of the target service and a new version of another service from the remote computer in response to determining, based on dependency information stored in an application package of the target service, that the target service depends on the another service, and in response to determining that the another service needs to be upgraded, wherein the dependency information comprises a dependency relationship between the target service and one or more other services.

10. The terminal device according to claim 9, wherein the dependency information is stored in a manifest file, and the dependency information is added to the manifest file at a phase of compiling the application package of the target service.

11. The terminal device according to claim 7, wherein the searching a class loader routing table to determine a class loader, and loading a class file of a sub-service of the target service by using the determined class loader comprises:
creating a first class loader and a second class loader of the target service, and storing correspondence information between the target service and the first class loader in the class loader routing table, wherein the class loader routing table comprises a correspondence between a package name and a corresponding service name, and a service stored in the class loader routing table comprises the sub-service;
invoking a loadClass method of the second class loader by using a loadClass method of the first class loader, to extract a package name of the sub-service and search the class loader routing table for a sub-service name and a class loader that match the package name of the sub-service; and
loading the class file of the sub-service by using the determined class loader.

12. The terminal device according to claim 7, wherein the running the new version of the target service comprises:
querying a configuration file of the target service; and
selecting, from a plurality of processes with different priorities, a target process indicated by the configuration file to run the target service.

13. The terminal device according to claim 7, wherein the running the new version of the target service comprises:
selecting, based on a process load condition, a target process from a plurality of processes with a same priority to run the target service, wherein a load of the target process is less than or equal to that of another process in the plurality of processes with the same priority.

14. The non-transitory computer-readable storage medium according to claim 8, wherein the downloading a new version of the target service from a remote computer in response to determining, based on the target service invocation request, that the target service needs to be upgraded comprises:

downloading the new version of the target service and a new version of another service from the remote computer in response to determining, based on dependency information stored in an application package of the target service, that the target service depends on the another service, and in response to determining that the another service needs to be upgraded, wherein the dependency information comprises a dependency relationship between the target service and one or more other services.

15. The non-transitory computer-readable storage medium according to claim 14, wherein the dependency information is stored in a manifest file, and the dependency information is added to the manifest file at a phase of compiling the application package of the target service.

16. The non-transitory computer-readable storage medium according to claim 8, wherein the searching a class loader routing table to determine a class loader, and loading a class file of a sub-service of the target service by using the determined class loader comprises:

creating a first class loader and a second class loader of the target service, and storing correspondence information between the target service and the first class loader in the class loader routing table, wherein the class loader routing table comprises a correspondence between a package name and a corresponding service name, and a service stored in the class loader routing table comprises the sub-service;

invoking a loadClass method of the second class loader by using a loadClass method of the first class loader, to extract a package name of the sub-service and search the class loader routing table for a sub-service name and a class loader that match the package name of the sub-service; and loading the class file of the sub-service by using the determined class loader.

17. The non-transitory computer-readable storage medium according to claim 8, wherein the running the new version of the target service comprises:

querying a configuration file of the target service; and selecting, from a plurality of processes with different priorities, a target process indicated by the configuration file to run the target service.

* * * * *